United States Patent [19]

Rotter

[11] Patent Number: 5,528,872
[45] Date of Patent: Jun. 25, 1996

[54] NAIL

[76] Inventor: Martin J. Rotter, 115 Lismore Ave., Glenside, Pa. 19038

[21] Appl. No.: 510,252

[22] Filed: Aug. 2, 1995

Related U.S. Application Data

[62] Division of Ser. No. 233,564, Apr. 26, 1994.

[51] Int. Cl.[6] .............................. E04B 1/38; F16B 15/00
[52] U.S. Cl. ...................... 52/748.10; 411/441; 411/546; 52/410; 52/543; 52/698
[58] Field of Search .............................. 52/698, 700, 408, 52/410, 521, 543, 58, 60, 748.10; 411/440, 441, 923, 546

[56] References Cited

U.S. PATENT DOCUMENTS

| | | |
|---|---|---|
| 1,108,209 | 8/1914 | Mitchell et al. . |
| 1,206,161 | 11/1916 | Stengel . |
| 2,048,234 | 7/1936 | Tucker . |
| 2,093,261 | 9/1937 | Willson . |
| 2,171,877 | 9/1939 | Johnson . |
| 2,557,370 | 6/1951 | Bussmann . |
| 2,853,746 | 9/1958 | Spencer et al. . |
| 3,495,368 | 2/1970 | Krause . |
| 4,399,643 | 8/1983 | Hafner . |
| 4,554,773 | 11/1985 | Conley ................................ 52/748.1 X |
| 4,781,508 | 11/1988 | Schroeder et al. . |
| 5,024,038 | 6/1991 | De Pellegrini et al. . |
| 5,099,627 | 3/1992 | Coulton ............................. 52/748.1 X |
| 5,167,579 | 12/1992 | Rotter . |
| 5,212,927 | 5/1993 | Sheahan ............................. 52/748.1 X |
| 5,349,804 | 9/1994 | Van Erden et al. ................ 52/748.1 X |
| 5,392,573 | 2/1995 | Gould . |

FOREIGN PATENT DOCUMENTS

| | | |
|---|---|---|
| 0249334 | 1/1964 | Austria . |
| 0090348 | 3/1959 | Netherlands . |

*Primary Examiner*—Wynn E. Wood
*Attorney, Agent, or Firm*—Panitch, Schwarze Jacobs & Nadel

[57] ABSTRACT

A nail and a method using the nail for securing two materials together spaced by an interposed resilient material. The nail has a shaft having a first end and a second end. The nail has a head extending radially around the shaft at the first end. The second end of the shaft has a point. A sleeve has generally a cylindrical shape and a pair of ends. The sleeve has a cylindrical center portion and a pair of frusto-conical tapered portions. Each of the frusto-conical tapered portions extends from the center portion to one of the ends forming a cutting edge. The sleeve surrounds the shaft and has a length in excess of the thickness of the resilient material and less than the length of the shaft. The method comprises the steps of laying the first material against the second material spaced by the resilient material, driving the nail through the first material, the resilient material and into the second material with the point of the shaft piercing the resilient material and the second material. It includes the cutting edge of the sleeve cutting the resilient material, moving the sleeve through the resilient material by the tapered. frusto-conical portion of the sleeve spreading the resilient material, and stopping the nail at a specific location by the sleeve engaging the second material, the hardness of the second material and the taper of the frusto-conical portion limiting movement of the sleeve through the second material.

6 Claims, 4 Drawing Sheets

NAIL

This is a division of application Ser. No. 08/233,564, filed Apr. 26, 1994.

FIELD OF THE INVENTION

This invention relates to a nail for fastening two sheet materials together and precisely spacing the two sheet materials a determined distance apart from each other. More particularly, the invention relates to a nail which includes a sleeve having a cutting edge for cutting through a resilient material sandwiched between the two sheets, the sleeve precisely positioning the one sheet apart from the other sheet.

BACKGROUND OF THE INVENTION

In building construction it is commonly needed to affix together various sheet materials which must be properly spaced apart from each other to achieve their intended function.

For example, it is desirable to ventilate an attic to equalize the attic temperature and pressure with that outside the building. This equalization inhibits moisture from condensing on insulation and wood roof materials, prevents build-up of ice dams, and reduces air-conditioning costs. One ventilating system is a roof ridge vent using a synthetic fiber matting, covered by asphalt cap shingles and fastened to the plywood roof sheathing, as disclosed in U.S. Pat. No. 5,167,579. The overlying cap shingles are secured to the sheathing by nails passing through the matting, and a nail should only be driven to a depth where the shingle remains spaced apart from the sheathing sufficiently to prevent the shingle from being dimpled around the nail site and the resilient material from being too greatly compressed.

Another example is placing a layer of foam insulation between vinyl or aluminum siding panels and the outer wall sheathing. Nails are received in slots in the siding panels and extend through the insulation material into an underlying sheathing. Similar to the roof venting system, the siding panels must be secured a distance apart from the sheathing to prevent the siding panels from dimpling and the insulation material from being crushed.

Nails have previously been developed for installing sheets of drywall to properly space the head of the nail from the stud surface underlying the drywall. These nails have a fluted shank which ensures that the head of the nail does not penetrate too deeply into the drywall. The flute crushes through the drywall until it engages the stud, thus ensuring that the head of the nail does not penetrate too deeply into the drywall. U.S. Pat. No. 4,781,508 discloses such a fluted nail.

However, fluted nails of that type are not capable of cutting through resilient materials such as the synthetic fiber matting or the foam insulation described above, and would instead compress or crush the resilient matting or foam material. Furthermore, such nails are not designed to seal over the hole created by the passage of the fluted shank to prevent moisture penetration, nor would they allow the slotted siding panels to slide literally along the nail.

SUMMARY OF THE INVENTION

The present invention provides a nail, and method, for securing together two sheet materials spaced apart from each other by an interposed resilient material. The nail has a head extending radially around the shaft at one end, a point at the other end, and a generally cylindrical sleeve carried by and surrounding the shaft adjacent the head end. The sleeve has a length in excess of the thickness of the resilient material and less than the length of the shaft. The sleeve has a cylindrical center portion and a pair of frusto-conical tapered portions. The tapered portion facing the point forms a cutting edge. The tapered portion facing and abutting the head end allows the outer sheet material to reseal under the nail head and, in the application with slotted siding panels, allows the panel to slide laterally.

The method comprises the steps of laying the first sheet material against and spaced apart from the second material by the resilient material, driving the point of the nail through the first material and the resilient material and into the second material. The cutting edge of the sleeve cuts the resilient material, moving the sleeve through the resilient material by the tapered frusto-conical portion of the sleeve spreading the resilient material, and stops the nail at a specific location by the sleeve engaging the second sheet material, the hardness of the second material and the taper of the frusto-conical portion limiting movement of the sleeve through the second sheet material.

Further objects, features and advantages of the present invention will become more apparent to those skilled in the art as the nature of the invention is better understood from the accompanying drawings and detailed description.

BRIEF DESCRIPTION OF THE DRAWINGS

For the purpose of illustrating the invention, the drawing show a form which is presently preferred; it being understood, however, that this invention is not limited to the precise arrangements and instrumentalities shown.

DESCRIPTION OF THE PREFERRED EMBODIMENT

Figure 1:
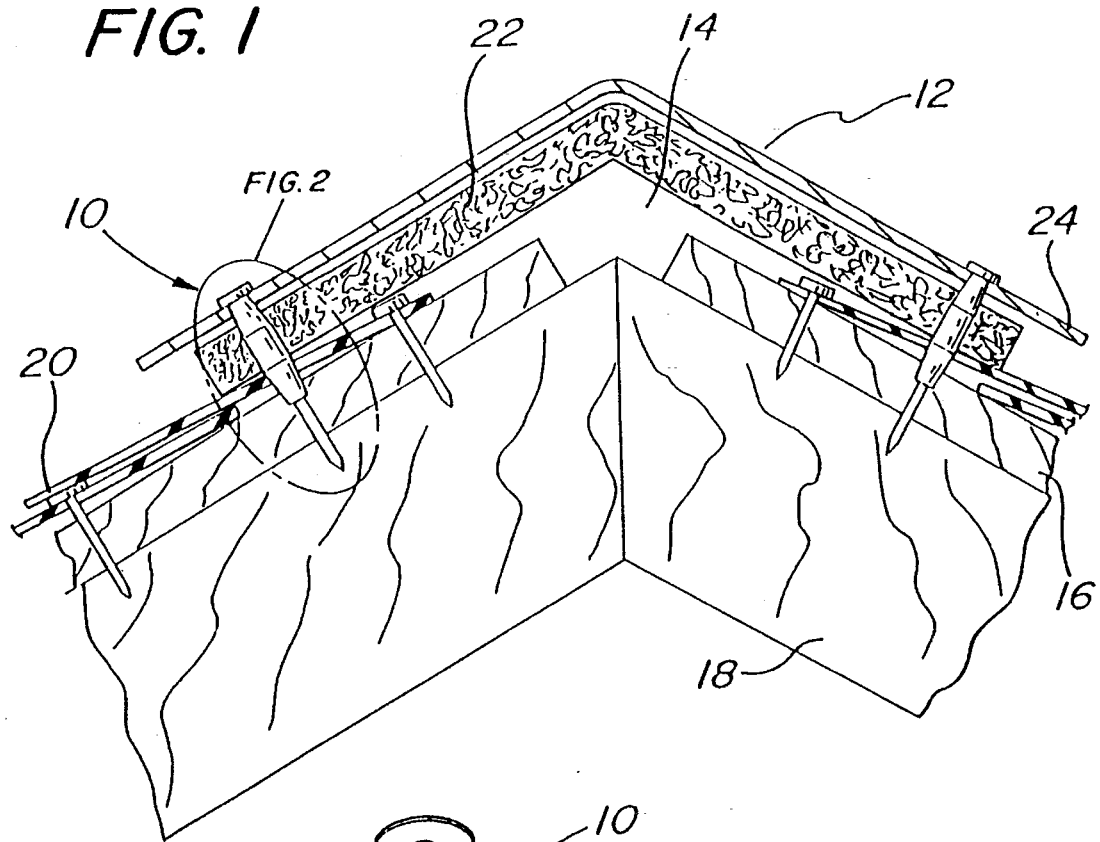
FIG. 1 is a side sectional view of the layers of a built-up roof showing a nail according to the invention.

Referring to the drawings in detail, wherein like numerals indicate like elements, and prime numbers (') indicate counterparts of such elements, FIG. 1 illustrates a nail 10 according one embodiment of the invention. Two alternative embodiments are later described to highlight the novel features of the nail 10.

Referring to FIG. 1, a venting system 12 is used to vent hot air from an attic through an open slot 14 in the ridge of a roof. The slot 14 is formed by cutting a sheeting material, such as an upper row sheathing panel 16, approximately ¾" short of the ridge crest formed by the rafters 18 in a roof truss, as shown.

Roof shingles 20 are laid in overlapping rows in the conventional manner up to the slot 14. A unitary mat 22 is made of randomly-aligned synthetic fabrics joined by phenolic or latex bonding which is heat cured to provide the mat 22 with varying mesh. The materials of the mat 22 are described in more detail in U.S. Pat. No. 5,167,579 which is incorporated herein by reference, and such mat is commercially available under the name COBRA® Ridge Vent sold by GAF Materials Corporation. The mat 22 is a continuous strip preferably about 10½" wide and ¾" thick. It runs the length of the slot 14 extending evenly on each side, and is of such low profile that it does not attract attention when covered by shingles of the same color and texture as used on the rest of the roof, such as a cap shingle 24. The mat 22 may easily be laid by unwinding one end of the material from a roll inserting over the slot 14 at one end, then unrolling it in a continuous strip to the other end where it is cut from the roll. Starting from one end and working to the other, each cap shingle 24 is then laid over the mat 22 and overlaps the edge of the preceding cap shingle 24, and is secured by driving the nail 10 of the invention through the cap shingle 24, mat 22 and the roof shingle 20 into the underlying sheathing 16 and rafters 18.

Figure 3:
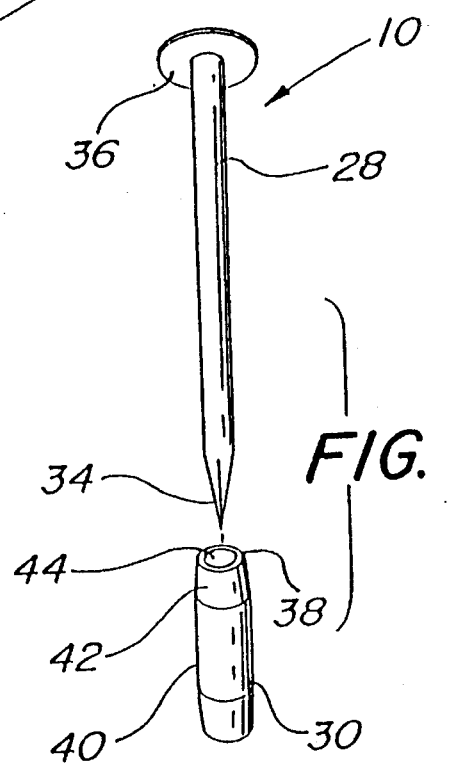
FIG. 3 is an exploded view of the nail.

Referring to FIG. 3, the nail 10 comprises a roofing nail 28 and a sleeve 30. The roofing nail 28 is of conventional construction having a shaft 32 that is pointed at one end 34 and a head 36 extending radially around the shaft 32 at the other end. The roofing nail 28 is preferably made of a galvanized material and is conventionally 2½" long. The sleeve 30 has a generally cylindrical shape having a pair of ends 38 that are parallel to each other and lie in planes transverse to the axes of the cylinder. The sleeve 30 has a cylindrical center portion 40 and a pair of frusto-conical tapered portions 42 extending from the center portion 40 to each of the ends 38. The ends 38 and the frusto-conical tapered portions 42 form cutting edges. The sleeve 30 has a cylindrical opening 44 extending between the ends 38 for receiving the shaft 32 of the roofing nail 28.

Figure 4:
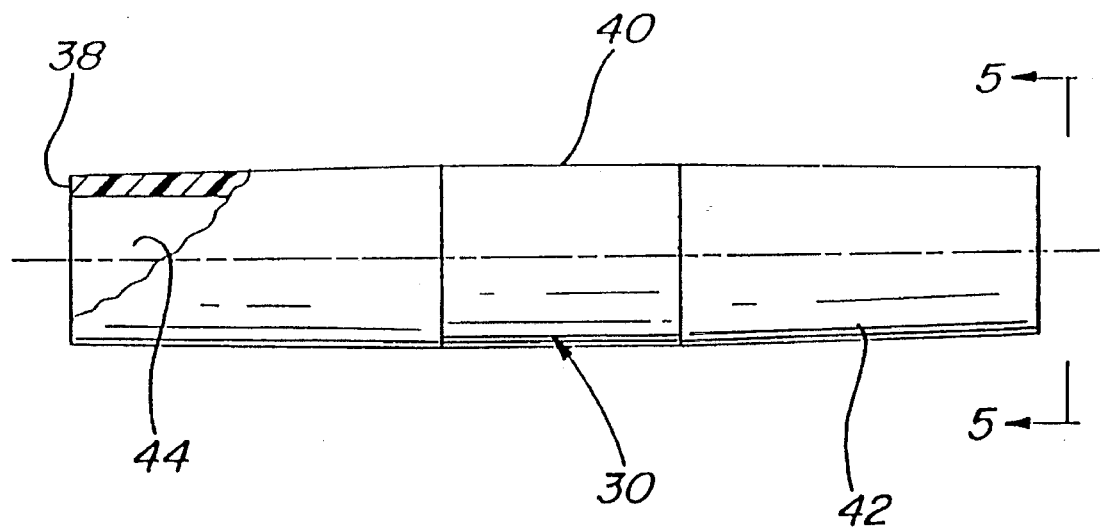
FIG. 4 is an enlarged view of the sleeve with a portion broken away.
Figure 5:
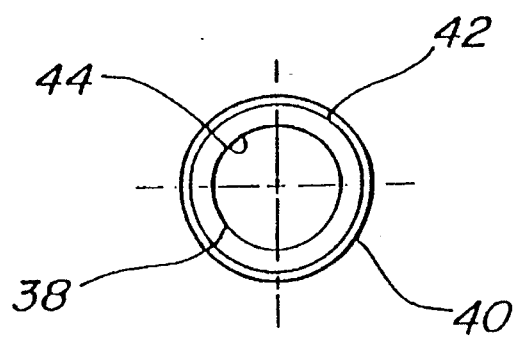
FIG. 5 is a side view taken along the line 5—5 shown in FIG. 4.

Referring to FIGS. 4 and 5, the frusto-conical portion 42 tapering down to the end 38 forms the cutting or knife edge at the end which enables the sleeve 30 to cut through the mat 22. The taper, the result of the frusto-conical portion 42, moves the mat 22 in the cap shingle 24 out of the way as the nail 10 enters the material. Furthermore, the taper prevents the cutting edge at the end 38 from continuing to drive into the sheathing, therein stopping the sleeve 30 and nail 10 at the proper position.

In a preferred embodiment for use with the roof ridge vent, for a mat 22 of ¾" thickness, the sleeve 30 is one inch long with the cylindrical center portion 40 being ¼" long and each frusto-conical portion being ⅜" long. The cylindrical opening has a diameter of 0.136" and the outer diameter of the sleeve 30 is 0.1875" (3/16"). The frusto-conical portion 42 tapers down to 0.171875" (11/64") diameter. Therefore, the thickness of the sleeve 30 at the end 38 is 0.0179375", defining a cutting edge in the end 38 of the sleeve 30 capable of cutting through the mat 22.

Figure 2:
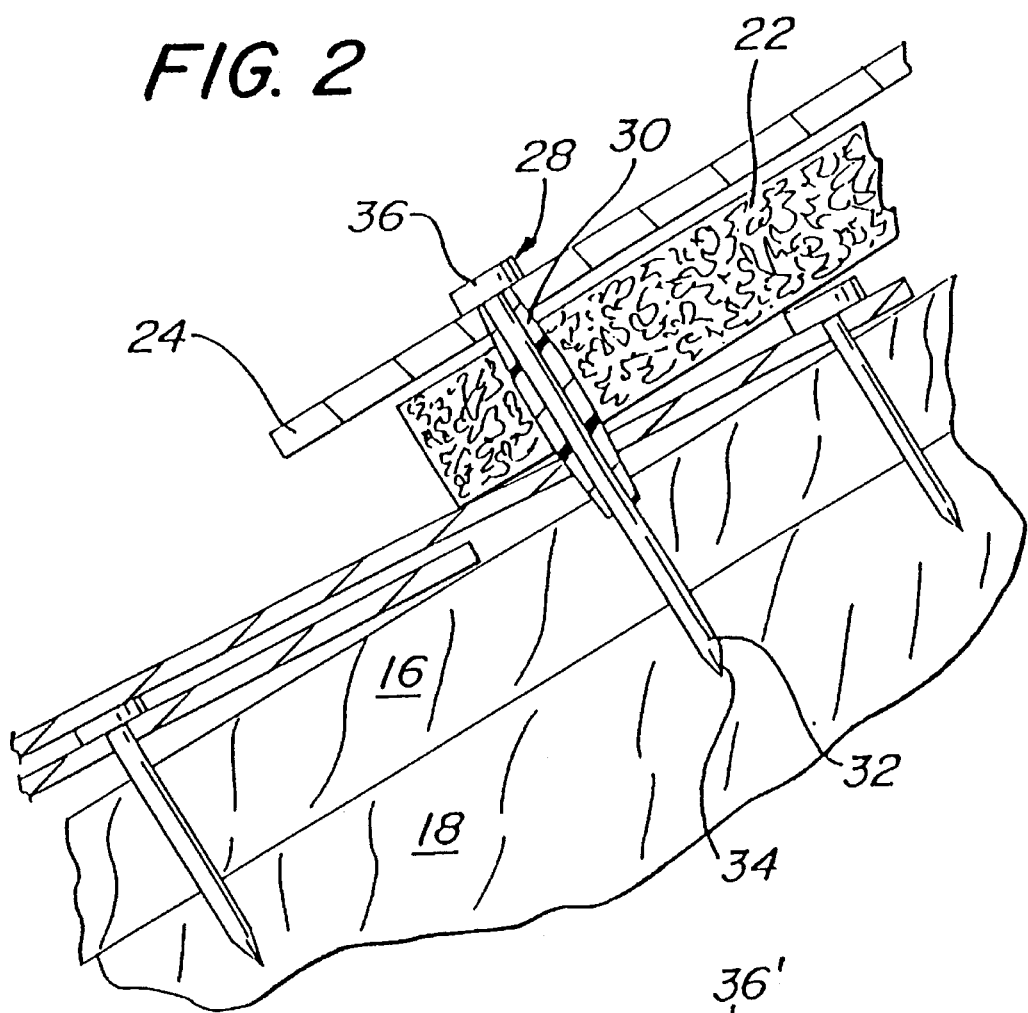
FIG. 2 is an enlarged sectional view taken along the line 2—2 shown in FIG. 1.

Referring to FIG. 2, the sleeve 30 is slipped over the shaft 32 of the roofing nail 28 prior to installation. The nail 10 may be driven in the conventional manner using a hammer. However, it an advantage that the nail 10 of this invention can be used with a pneumatic gun or other automated driving means for delivering the nail 10. It is recognized that sleeve 30 could be coated with a fluoropolymer to ease the movement of the sleeve 30 past the fibers in mat 22.

As the nail 10 is driven through the cap shingle 24, the pointed end 34 of the roofing nail 28 makes the first penetration through the shingle 24 and punctures the mat 22. The frusto-conical portion 42 of the sleeve 30 enlarges the opening in the shingle 24, with the end 38 initially cutting the shingle 24, thus allowing the sleeve 32 to pass through the shingle 24. The cap shingle 24 is preferably an asphalt-based material. Asphalt shingles are resilient enough that the shingle 24 will deform to allow the sleeve 30 to pass through.

The end 38 acts as a cutting or knife edge to cut through the mat 22 with the frusto-conical portion 42 pushing the fibers in mat 22 to the side as it passes through mat 22. As the nail 10 is driven, the sleeve 30 makes contact with the sheathing panel 16 and, while penetrating slightly because of the cutting edge of the end 38, the hardness of the sheathing panel 16 and the taper of the frusto-conical portion 42 limits the depth that the sleeve 30 may enter the panel 16. This depth and the length of sleeve 30 spaces the head 36 of the roofing nail 28 from the sheathing panel 16 the proper amount to secure the cap shingle 24 and the mat 22.

The unitary mat 22 is resilient such that it flexes back around the upper frusto-conical portion 42 of the sleeve 30 therein sealing the sleeve 30 within the material. The asphalt shingle is sufficiently pliant in normal temperatures that, shortly after the nail 10 is installed, ambient temperature will cause the cap shingle 24 to melt slightly and conform to the frusto-conical portion 42 of the sleeve 30, creating a greater seal than would be achieved with just the head 36.

Figure 6:
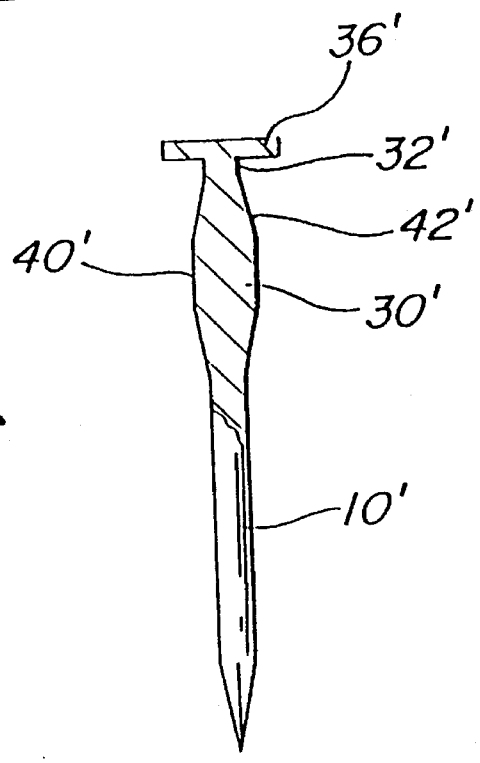
FIG. 6 is an alternative embodiment of the nail.

Referring to FIG. 6, an alternative embodiment of the nail 10' is shown. The nail 10' has a integral sleeve 30' with the roofing nail 28'. The sleeve 30' has a cylindrical center portion 40' and a pair of frusto-conical tapered portions 42' extending from the center portion 40'. The frusto-conical portion 42' tapers down at the end of the sleeve 30' toward the end 34' to form a cutting or knife edge 38'. The upper frusto-conical portion 42', in proximity to the head 36' of the nail 28', allows the resilient materials such as the fibers in mat 22' to close up. Any compression of the mat 22' during driving of the nail 10' will dissipate shortly. Furthermore, the cap shingle 24 of the first embodiment melts slightly and conform to the shape of the shaft 32' above the frusto-conical portion 42' creating a seal.

Figure 7:
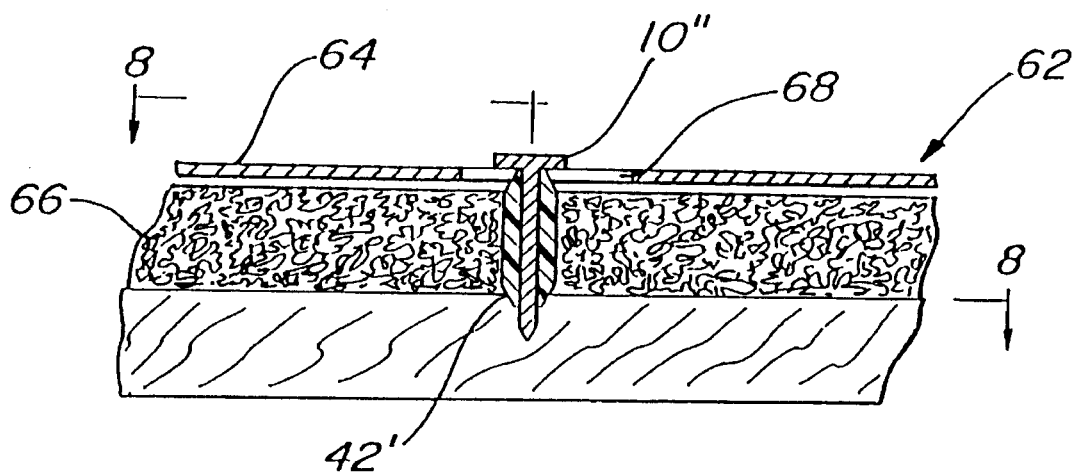
FIG. 7 is a side view of a nail according to the invention in relation to a siding installation.
Figure 8:
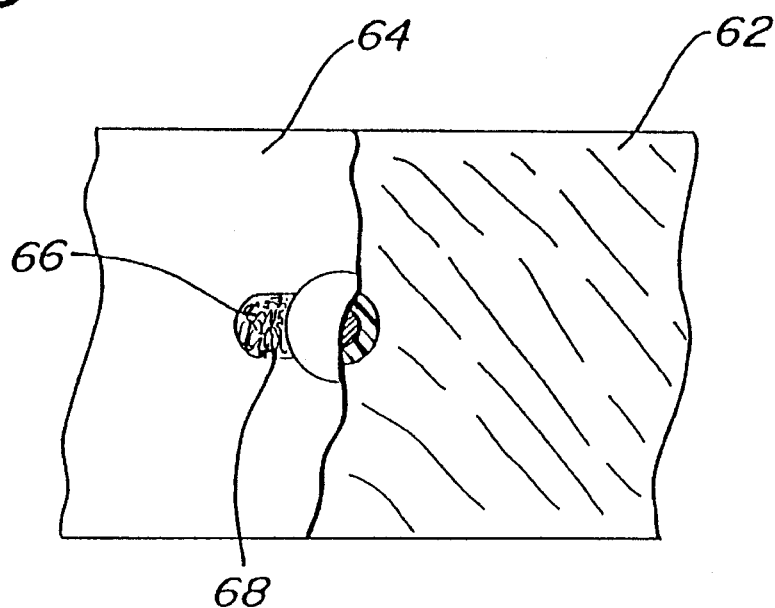
FIG. 8 is a sectional view taken along the line 8—8 shown in FIG. 7.

Referring to FIGS. 7 and 8, an alternate use for nail 10" is shown. A building side 60 has a plywood sheathing 62, siding 64, and interposed insulation 66. The siding 64 is conventionally made of a material such as aluminum or vinyl and has a slot 68 through which the nail 10" is inserted.

The nail 10" is sized for the thickness of the insulation 66 and the size of the slot 68 in the conventional siding 64. The nail 10" has a sleeve 30" having a cylindrical center portion 40" sized the same as the minor axis of the slot 68. In addition, the sleeve 30" has a pair of frusto-conical tapered portions 42" extending from the center portion 40" to each of its ends 38".

As the nail 10" is driven through the slot 68 in the siding, the frusto-conical portion 42" and sleeve 30" acts as a cutting or knife edge 38" to cut through the resilient insulation 66. As the nail 10" is driven, the sleeve 30" makes contact with the sheathing 62. The knife edge formed by the end 38' engages and penetrates slightly into the sheathing 62. The hardness of the sheathing 62 and the taper of the frusto-conical portion 42" limits the depth the sleeve 30" enters the sheathing 62, thus positioning the nail 10".

The upper frusto-conical portion 42" of the sleeve 30", being smaller than the cylindrical portion 40" of the sleeve 30" is, thus, smaller than the minor axis of slot 68. Therefore, the siding 64 is located between the head 36" of the nail 28" and the cylindrical portion 40" of the sleeve 30". The frusto-conical portion 42" that is in proximity to the slot 68 allows the siding 64 to move laterally relative to the nail 10" between the head 36" and the cylindrical portion 40" of the sleeve 30" upon expansion and contraction. It is recognized that the nail 10" could be used to secure the insulation 66 having outer shell and not associated with a siding 64.

The present invention may be embodied in other specific forms without departing from the spirit or essential attributes thereof and, accordingly, reference should be made to the appended claims, rather than to the foregoing specification, as indicating the scope of the invention.

I claim:

1. A method of securing a first sheet material to a second sheet material, a resilient material interposed between the sheet materials comprising the following steps:

laying the first sheet material against the second sheet material with the resilient material sandwiched therebetween;

driving a nail through the first sheet material, the resilient material and into the second sheet material, the nail having a shaft with a head extending radially around the shaft at one end and a point at the other end spaced from the one end in excess of the distance between the first and second sheet materials, the point capable of piercing the resilient material and the second sheet material;

cutting the resilient material by a sleeve carried by the shaft having a frusto-conical portion taper to a first end forming a cutting edge;

moving the sleeve through the resilient material by the tapered frusto-conical portion of the sleeve spreading the resilient material; and stopping the nail at a specific location by the sleeve engaging the second sheet material, the hardness of the second sheet material and the taper of the frusto-conical portion limiting movement of the sleeve through the second sheet material.

2. A method of securing a first sheet material to a second. sheet material as in claim 1 wherein the step of laying the first sheet material against the second sheet material comprises the following steps:

laying the resilient sheet material on the second sheet material; and laying the first sheet material on the resilient material therein spacing the first sheet material from the second sheet material by the resilient material.

3. A method of securing a first sheet material to a second sheet material as in claim 1 wherein the step of laying the first sheet material against the second sheet material comprises the following steps:

securing the resilient material to the first sheet material; and laying the first sheet material and resilient material combination on the second sheet material therein spacing the first sheet material from the second sheet material by the resilient material.

4. A method of securing a roof vent having an air permeable mat to a roof, comprising the following steps:

providing an open slot along substantially the length of a roof ridge permitting ventilation from the interior space under the roof to the exterior;

laying the air permeable mat on the roof covering the slot over the length of the slot;

laying a capping structure overlying the mat and spaced away from the roof by the thickness of the mat to provide ventilation fix rough the mat in the space between the capping structure and the roof; and driving a nail fix rough the first sheet material, the resilient material and into the second sheet material, the nail having a shaft with a head extending radially around the shaft at one end and a point at the other end spaced from the one end and having a length sufficient to pass completely through when fully inserted, the point capable of piercing the resilient material and the second sheet material;

cutting the resilient material by a sleeve carried by the shaft having a frusto-conical taper to a first end forming a cutting edge;

moving the sleeve through the resilient material by the tapered frusto-conical portion of the sleeve spreading the resilient material; and stopping the nail at a specific location by the sleeve engaging the second sheet material, the hardness of the second sheet material and the taper of the frusto-conical portion limiting movement of the sleeve through the second sheet material.

5. A method of securing a roof vent as in claim 4 wherein the capping structure is an asphalt shingle and the sleeve having a second frusto-conical taper to a second end in proximity to the head and further comprising the step of sealing the shingle to the nail at ambident temperature.

6. A method of securing a roof vent as in claim 5 wherein the mat is an air permeable and resilient member of randomly aligned synthetic fibers which are open and blended, randomly aligned into a web by an airflow, joined by phenolic or latex binding agents and heat cured to produce a varying mesh, the mat being of unitary sheet construction having no dissimilar sheets laminated or otherwise bonded together.

* * * * *